United States Patent [19]
Sato et al.

[11] 3,867,558

[45] Feb. 18, 1975

[54] PRESERVING RED COLOR IN FRESH RAW UNCURED RED MEATS

[75] Inventors: Kunito Sato, Chicago; Harold K. Herring, Wheaton, both of Ill.

[73] Assignee: Armour and Company, Phoenix, Ariz.

[22] Filed: Mar. 11, 1974

[21] Appl. No.: 449,764

Related U.S. Application Data

[63] Continuation-in-part of Ser. No. 353,315, April 23, 1973, abandoned.

[52] U.S. Cl................. 426/265, 426/212, 426/264, 426/266, 426/371
[51] Int. Cl............................................. A23b 1/00
[58] Field of Search ........... 426/212, 264, 265, 266, 426/371

[56] References Cited
UNITED STATES PATENTS

| | | | |
|---|---|---|---|
| 3,186,853 | 6/1965 | Meusel............................ | 426/264 X |
| 3,477,859 | 11/1969 | Brown et al. ....................... | 426/265 |
| 3,597,236 | 8/1971 | Hopkins et al...................... | 426/265 |
| 3,821,444 | 6/1974 | Sato et al......................... | 426/371 X |

*Primary Examiner*—Hyman Lord
*Attorney, Agent, or Firm*—Frank T. Barber; Carl C. Batz

[57] ABSTRACT

A process for preserving the bright red color of fresh raw uncured red meat by incorporating into the meat a special gamma-pyrone and storing the meat at a refrigerated temperature for a period of at least twenty-four hours, the special gamma-pyrone being 3-hydroxy-2-methyl-gamma-pyrone or 3-hydroxy-2-ethyl-gamma-pyrone or 5-hydroxy-2-methyl-gamma-pyrone or mixtures thereof. Also meats having a bright red color and containing said special gamma-pyrone for inhibiting change in color.

8 Claims, No Drawings

PRESERVING RED COLOR IN FRESH RAW UNCURED RED MEATS

This application is a continuation-in-part of our co-pending application Ser. No. 353,315 filed Apr. 23, 1973, entitled Preserving Red Color in Meats now abandoned.

This invention relates to processes for preserving the bright red color of red meats which have been freshly cut, and to the meats of bright red color which are treated to retain their bright red color after a period of storage at refrigerated temperatures.

BACKGROUND

It is well known that although meats such as beef, pork and lamb have a bright red color after they have been cut or ground, this color fades after a period of exposure to the atmosphere. This change in color does not mean that there has been any bacterial action or spoilage and the discolored meat is just as wholesome and just as nutritious as it was when cut, but after exposure to the atmosphere, which may take place during marketing, the meat is somewhat less attractive than would be desirable.

The red meats shortly after cutting or grinding have a bright red color. Then after about a day the bright red color begins to fade and the color changes to a reddish brown, then in about another day to a brownish red, and in still another day to brown, and in about four days to a dark brown color, Pork sausage is known to have a very pronounced color change when held in a refrigerated display case for periods of a few days after the meat is comminuted.

It is therefore a principal object of this invention to provide a process for handling the red meat so that the change in color which normally takes place will be avoided or delayed so as to preserve the bright red color during a storage period of a day or more. A further object is to discover such a process which is effective and practical and in no way harmful to the meat. Other objects will be apparent as this specification proceeds.

SUMMARY OF THE INVENTION

We have discovered that if gamma-pyrones, particularly 3-hydroxy-2-methyl-gamma-pyrone or 3-hydroxy-2-ethyl-gamma-pyrone or 5-hydroxy-2-methyl-gamma-pyrone, or mixtures thereof, are incorporated into fresh raw uncured meat having a bright red color at a minimum level of 0.01 percent by weight of the meat and the meat, having a gamma-pyrone incorporated therein, is placed in storage at refrigerated temperature for a day or more, the resulting meat will keep its bright red color and resist for a longer time the change to a brown or dark brown color.

DETAILED DESCRIPTION

The present invention is applicable to all meats of the type classed as red meats. This includes beef, pork and lamb, and the meat of other animals which has a red color. The red meat animals are distinguished from poultry, for example, which has meat of a light pink color not classed as red. The red color is believed to be closely associated with the protein myoglobin of the muscle and the hemoglobin of blood, and both proteins may exist in many forms.

The red meat is made up of lean meat, water and fat, and the lean meat contains proteins such as myoglobin and hemoglobin. The fat is believed not to have any part in the change in color from the initial bright red color of the meat, but may have a substantial role in the development of rancidity or off flavors.

Some of the special gamma-pyrones which we utilize in this invention have been known to be naturally contained in small amounts in some foods. For example, 3-hydroxy-2-methyl-gamma-pyrone has been found in bread, dried milk, dried whey and soybeans.

The chemical structure of our special compounds is further illustrated by the following structural formulae:

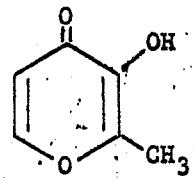

3-hydroxy-2-methyl-gamma-pyrone

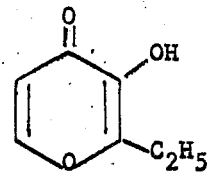

3-hydroxy-2-ethyl-gamma-pyrone

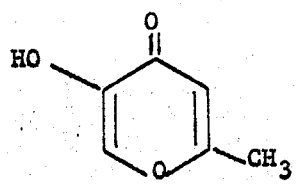

5-hydroxy-2-methyl-gamma-pyrone

Our process involves the treatment of fresh raw uncured red meats only. By "fresh" we mean taken from a slaughtered animal and which has not had time or opportunity to develop bacterial spoilage in any degree. By "raw" we mean that the meat has not been cooked. No cooking takes placing during the conduct of our process and the benefits of color retention according to our process may be had up to the time the meat is cooked. Cooking brings on quite a different transformation in color than what we have been refering to in connection with our improved process.

Also, curing of the meat is not involved in our process, and our process does not include the treatment of meats which have cured. It appears the nitrates or nitrites involved in curing do themselves become involved in the chemistry of meat color and so interfere with the action of our gamma-pyrones in accordance with our process. Therefore, we utilize only uncured meat, but by using the term "uncured" we do not wish to exclude those meats which have been salted to taste or contain less than a small quantity, of the order of 2 or 3 percent of salt, which meats are classed as uncured rather than cured.

We may use any of the gamma-pyrones mentioned above or may use any two of them or all together in any desired proportions. It is not the purpose of our process to give flavoring or odor of any kind to the meat which is treated and we prefer that there be as little change as possible in a natural flavor and odor of the meat. We find that the use of 3-hydroxy-2-methyl-gamma-pyrone appears to contribute a slight odor to the meat, but this is hardly noticeable. Such odor may be described as fragrant, and is usually not objectionable. In this respect we prefer the use of 5-hydroxy-2-methyl-gamma-pyrone. Also the slight odor contributed by 3-hydroxy-2-methyl-gamma-pyrone may, if desired, be minimized by utilizing a proportion of 5-hydroxy-2-methyl-gamma-pyrone in the mixture. Meats treated with any of these compounds usually have very little or no odor after cooking when the gamma-pyrone compound is used at a level of 0.01 to 0.30 percent and in the case of 5-hydroxy-2-methyl-gamma-pyrone have almost no detectable odor.

In this detailed description of our process we will first refer to the treatment of beef, such as meat from the round of beef. Pieces of meat from the beef round may first be ground by passing them through a grinder having a plate with 1/8 inch openings in accordance with the usual practice for preparing ground beef. To a quantity of the ground beef we may add one of the compounds 3-hydroxy-2-methyl-gamma-pyrone, 3-hydroxy-2-ethyl-gamma-pyrone or 5-hydroxy-2-methyl-gamma-pyrone or mixtures thereof, and mix this thoroughly into the ground meat. As previously stated the minimum amount of the compound to be effective for retarding color change has been found to be about 0.01 percent by weight of the meat. About 0.05 percent has been found to give about a maximum effect, but more may be added. About the only limitation on the amount is that when using 3-hydroxy-2-methyl-gamma-pyrone the larger amounts of gamma-pyrone may contribute a slight odor which, though pleasant, may not be desired.

After the gamma-pyrone compound has been incorporated into the ground meat by thoroughly mixing the compound therein, the meat containing the gamma-pyrone compound may be divided into portions or patties which may be wrapped and put in refrigerated storage for a period of at least about 24 hours. It should, of course, be understood that instead of the beef referred to, the meat may be any kind of red meat which is raw uncured and uncooked. The storage step may be carried out in the ordinary refrigerated display case used in the marketing of meats, at a temperature of from 30° to 60°F., preferably 30° to 45°F.. The refrigerated display case also exposes the meats stored therein to light of one or another character, which may be a fluorescent light or daylight, and it is significant that the usual effect of light on the red color of the meat is inhibited by the presence of the gamma-pyrone in the meat.

The storage period of 24 hours or more is essential to our process because it normally takes about this time for significant color change to take place, and it is the action of the gamma-pyrone during this period in the inhibition of color change that gives the results which we achieve. Meat that normally would show appreciable change in color in 24 hours after cutting or comminuting will in our process show no change and the situation which is even more significant is that meat which will normally turn brown in a period of three or four days after cutting or grinding will in our process retain its bright red color for two or three days and keep a substantially red color for four or five days. This extended period during which the meat retains its red color gives a great benefit in the marketing of the raw meat through retail channels. In some cases we have found that the period of storage may be extended to nine or 10 days and in a few cases up to 16 days before the color changes to dark brown. While it is essential that the raw meat be stored for at least 24 hours, it is recommended that the storage period be extended for at least four or five days or until the meat is sold to the consumer.

We find, further, that particularly good results are obtained when using pork sausage, where sodium chloride or other spice ingredients are included. We consider it to be an added advantage that out treatment may be utilized along with additions of sodium chloride, and that these additions are compatible and harmonious in their function in either beef, pork or lamb, particularly so with pork sausage.

In the case of cut meats such as beef steaks or pork chops which are not ground or otherwise comminuted, the gamma pyrone compounds may be incorporated in the meat by applying solutions of the compounds to the surfaces of the meat pieces. Each of the gamma-pyrone compounds are soluble in water at least to some extent and it is satisfactory that the aqueous solution contain of the order of 0.05 to 1 percent by weight of the gamma-pyrone compounds, this percentage being based on the weight of the meat. The aqueous solution may be applied to the meat surface in any desired way such as by spraying the solution onto the meat surface. The gamma-pyrone compound then absorbs into the meat. Such application may continue until the meat contains the compound in a concentration of at least 0.01 percent of the weight of the meat.

We have further found that the use of the gamma-pyrone compounds in our process contribute an unexpected side effect in that they inhibit the growth of microorganisms and so restrain the development of bacteria which, if unrestrained during the storage period could tend to cause the meat to become unwholesome.

Following are specific examples in which our process is utilized and the product tested as to color change.

EXAMPLE I

Meat from the round of beef was ground in the usual way and 0.05 percent by weight, based on the weight of the meat, of 3-hydroxy-2-methyl-gamma-pyrone was mixed thoroughly into one portion of the meat and another portion was used as a control. The meat was then formed into patties and placed into a retail refrigerated display case. The meat of each sample was examined as to color when placed in the case and also at the end of each of the four succeeding days. The following observations were made:

| Treatment | Odor | Initial Color | Days in retail display case at a temp. of 36 to 40°F. | | | |
|---|---|---|---|---|---|---|
| | | | 1 | 2 | 3 | 4 |
| Control | meat | bright red | red, trace brown | brown-red | brown | brown |

-Continued

| Treatment | Odor | Initial Color | Days in retail display case at a temp. of 36 to 40°F. | | | |
|---|---|---|---|---|---|---|
| | | | 1 | 2 | 3 | 4 |
| 3-hydroxy-2-methyl-gamma-pyrone | fragrant | bright red | bright red | bright red | red | brown-red |

EXAMPLE II

Samples of ground meat were treated as in Example I except that one sample was retained as control and the other sample treated with 3-hydroxy-2-ethyl-gamma-pyrone. The following observations were made:

| Treatment | Odor | Inital Color | Days in retail display case at a temp. of 36 to 40°F. | | | |
|---|---|---|---|---|---|---|
| | | | 1 | 2 | 3 | 4 |
| Control | meat | bright red | red, trace brown | brown-red | brown | brown |
| 3-hydroxy-2-ethyl-gama-pyrone | fragrant | bright red | bright red | bright red | red | brown-red |

EXAMPLE III

Samples may be prepared as in Example I and one sample used as a control while 0.05 percent by weight of 5-hydroxy-2-methyl-gamma-pyrone is incorporated in the treated sample and the samples stored as described in Example I. Results similar to those reported in Examples I and II may be expected, except that substantially no odor should be noticeable other than the natural odor of the meat.

EXAMPLE IV

To demonstrate the effect of different amounts of the gamma-pyrone we prepared ground beef as in Example I and divided this into five samples, one of which was reserved for control. In the other samples there was incorporated respectively 0.2 percent, 0.1 percent, 0.05 percent and 0.01 percent by weight of 3-hydroxy-2-ethyl-gamma-pyrone, and each of these samples were stored at 38°F.. The following observations were made:

| Treatment | Initial Color | Days at 38°F. | | |
|---|---|---|---|---|
| | | 3 | 4 | 5 |
| Control | bright red | brown, trace red | brown | brown |
| 0.2% | bright red | red | red | red-brown |
| 0.1% | bright red | red | red | red-brown |
| 0.05% | bright red | red | red | red-brown |
| 0.01% | bright red | red, trace brown | brown | brown |

EXAMPLE V

To test the process as to whole cuts of meat we selected strip beef steaks. In some cases we dipped the steaks into a 1 percent water solution of the gamma-pyrone and in other cases we pipetted such a solution on to the surface of the steak. One sample was left untreated as a control. Following are the tabulated results:

| Treatment | % of Gamma-Pyrone | Initial | Days in retail display case at a temp. of 36 to 40°F. | | |
|---|---|---|---|---|---|
| | | | 3 | 4 | 5 |
| Control | — | bright red | brown-red | brown | brown |
| 3-hyroxy-2-methyl-gamma-pyrone | 0.015 | bright red | red | red | red, some brown |
| 3-hydroxy-2-ethyl-gamma-pyrone | 0.014 | bright red | red | red | red, some brown |

EXAMPLE VI

To demonstrate the improved process with respect to sausage we selected two samples of sausage and used one as a control; in the other we incorporated 0.25 percent by weight of 3-hydroxy-2-methyl-gamma-pyrone, and treated the samples as described in Example I, with the following results:

| Treatment | Initial | Days in retail display case at a temp. of 36 to 40°F. | | | |
|---|---|---|---|---|---|
| | | 3 | 5 | 6 | 7 |
| Control | red | red, trace brown | brown | brown | brown |
| 3-hydroxy-2-methyl-gamma-pyrone | bright red | bright red | red | red | red-brown |

EXAMPLE VII

To demonstrate the effect of the gamma-pyrone treatment as to bacterial development, we selected two samples of sausage, used one as a control, and treated the other with 3-hydroxy-2-methyl-gamma-pyrone at a level of 0.25 percent by weight of the meat. The samples were formed into links and stored under refrigerated conditions at a temperature of from 36° to 40°F. and tested for bacterial growth when placed in storage and also at the end of three, six and nine days. The results are reported as follows:

| Treatment | Numbers of lactic acid bacteria per gram | | | |
|---|---|---|---|---|
| | Initial | Days | | |
| | | 3 | 6 | 9 |
| Control | 130,000 | 220,000 | 2,500,000 | 50,000,000 |
| 3-hydroxy-2-methyl-gamma-pyrone at a level of 0.25% of the weight of the meat | 110,000 | 120,000 | 140,000 | 4,600,000 |

EXAMPLE VIII

The same tests as reported in Example VII were repeated but with the samples formed into 1 pound chubs instead of formed into links with the following results:

| Treatment | Numbers of bacteria per gram (total bacterial count) Days in storage at 36 to 40°F. | | | | |
|---|---|---|---|---|---|
| | 1 | 3 | 6 | 9 | 11 |
| Control | 370,000 | 7,000,000 | 70,000,000 | 200,000,000 | 350,000,000 |
| 3-hydroxy-2-methyl-gamma-pyrone at a level of 0.25% | 210,000 | 310,000 | 550,000 | 3,500,000 | 15,000,000 |

EXAMPLE IX

To demonstrate the effect of the improved process in connection with frozen meats two 1 pound chubs of pork sausage were selected; one was held as a control and the other was treated with 3-hydroxy-2-methyl-gamma-pyrone. Each sample was stuffed into a white polyethylene casing, frozen at −10°F. and stored in a freezer at −10°F. for 6 weeks after which it was stored in a retail display case at a temperature of 36° to 40°F.. Examinations were made three days after meat was put in the display case, with the following results.

| Treatment | Color of sausage after placing in storage at 36 to 40°F. for 3 days | |
|---|---|---|
| | Exterior | Interior |
| Control | brown | red |
| 3-hydroxy-2-methyl-gamma-pyrone | red | red, trace brown |

EXAMPLE X

To determine the effect of the gamma-pyrone treatment of meats when combined with salts we selected three samples of lean ground pork, one was treated with sodium chloride in the usual amounts and another was treated with sodium chloride with sodium isoascorbate added, and the third was treated with sodium chloride at a 1 percent level and 3-hydroxy-2-methyl-gamma-pyrone at the 0.1 percent level with the following results:

| Treatment | Initial | Days stored in retail display case at a temp. of from 36 to 40°F. | | |
|---|---|---|---|---|
| | | 18 hours | 5 days | Interior Color 5 days |
| 3-hydroxy-2-methyl-gamma-pyrone + sodium chloride | red | red | red | red |
| Sodium chloride | red | red-brown | brown | brown, interior core |
| Sodium isoascorbate + Sodium Chloride | red | red-brown | red-brown | brown, interior core |

EXAMPLE XI

To test the prevention of color change using 3-hydroxy-2-ethyl-gamma-pyrone in various amounts we used five portions of fresh pork sausage, each weighing from 1 to 2 pounds and being made of pork trimmings and picnics. The fat content was in the range of 31 to 48.5 percent based on the weight of the total meat. One portion was used as a control and the various levels of 3-hydroxy-2-ethyl-gamma-pyrone were added to the other portions. The 3-hydroxy-2-ethyl-gamma-pyrone was added in the form of a water slurry.

Observations were as follows:

| Treatment | Initial Color | Days in retail display case at a temp. of 36 to 40°F. | | | |
|---|---|---|---|---|---|
| | | 1 | 2 | 3 | 4 |
| Control | Bright red | red | slight brown | brown | dark brown |
| 0.02% | bright red | red | red | red-brown | brown, trace, red |
| 0.05% | bright red | red | red | red-brown | brown, trace red |
| 0.10% | bright red | red | red | red-brown | brown, trace red |
| 0.20% | bright red | red | red, best color | red-brown | brown, trace red |

The control and the portions treated with 0.05% of 3-hydroxy-2-ethyl-gamma-pyrone were further tested for rancidity at the end of eight days and none were found to have any degree of rancidity.

EXAMPLE XII

The portion of sausage prepared as in Example XI which contained 0.02% of 3-hydroxy-2-ethyl-gamma-pyrone was cooked and was subjected to a 10 member taste panel with the following results:

| Panelists | Control | Treated 3-hydroxy-2-ethyl-gamma-pyrone | Comments |
|---|---|---|---|
| A | Sweet, acceptable | acceptable | not enough sage in both samples |
| B | O.K. | O.K. | Control appeared to be burnt, treated sample seemed carmelized |
| C | very acceptable | acceptable | intensity of salt higher in control than treated |
| D | sweet, acceptable | acceptable | not enough sage in both samples |
| E | not much odor | so, so odor | control rancid |

| Panelists | Control | Treated 3-hydroxy-2-ethyl-gamma-pyrone | Comments |
|---|---|---|---|
| F | sweet, carmelized | sweet, carmelized | both acceptable |
| G | pleasant odor | pleasant | both acceptable |
| H | salty | bit sweet | O.K. |
| I | satisfactory | satisfactory | no difference |
| J | O.K. | O.K. | O.K. |

Subject to variations in the perception of individuals on the panel the conclusion was that both portions were acceptable as to taste.

EXAMPLE XIII

To further demonstrate the effect of the inclusion of the gamma-pyrone compounds and subsequent storage on the development of color and rancidity in pork sausage we prepared two 1 pound portions of sausage as previously described. One of the samples was used as a control and 3-hydroxy-2-methyl-gamma-pyrone was incorporated in the other at a level of 0.25%. These portions were frozen and held in frozen storage for four months after which they were tested for TBA absorbance value. The TBA test is a chemical test which measures rancidity development and is particularly described in an article contained in Vol. 37, page 44 of the *Journal of American Oil Chemists' Society* by B. G. Tarladgis, B. M. Watts, M. T. Younathan and L. R. Dugan, 1960, entitled "A Distillation Method for the Quantitative Determination of Malonaldehyde in Rancid Foods".

The results of the tests were as follows:

| Treatment | Color Exterior | Color Interior | TBA Absorbance |
|---|---|---|---|
| Pork Sausage (control) | red | brown (undesirable) | 0.091 |
| Pork Sausage + 0.25% 3-hydroxy-2-methyl-gamma-pyrone | red | red, trace brown | 0.052 |

This analysis indicates that the degree of rancidity development during storage in the control was greater than that of the treated sausage.

EXAMPLE XIV

To demonstrate the effect of incorporating the gamma-pyrone compounds on the color of meat beneath the surface we prepared 100-gram aliquots of ground beef, one serving as a control. To one other we added 3-hydroxy-2-ethyl-gamma-pyrone at the 0.2% level and to another we added 0.066% of nicotinic acid. The 3-hydroxy-2-ethyl-gamma-pyrone and the nicotinic acid were added as a water slurry. The samples were each wrapped in oxygen permeable film and stored in a refrigerator display case at 4°C. for 1 ½ days and then frozen for six days after which the samples were noted as to exterior color and then carefully sectioned. The samples were in the form of patties about one inch thick.

Each of the samples had a red colored exterior Examination of the cross section of the patties showed that in the control sample the reddish color extended from the surface about 1/16 inch into the interior, and under this was a layer of about 3/16 inch which has a brown color, and the interior of the patty was of a purple red color. The sample to which 3-hydroxy-2-methyl-gamma-pyrone had been added was red to a depth of 3/16 inch below the surface and below this was a brown layer of 3/16 inch, with a center layer of purple red. The sample to which the nicotinic acid had been added had a reddish color to a depth of less than 1/16 inch and below this was a ⅜ inch layer of brown color with a purple red interior of the patty.

Although we have no explanation for the increased depth of the outer red layer next to the surface in the case of the meat containing the gamma-pyrone compound, it is our belief that this phenomenon is associated with the extended red color retention we have found to be brought about by these compounds.

Although we have described in detail only certain embodiments of our invention, it is to be understood that the invention may be practiced in many ways and many changes may be made without departing from the spirit of the invention all within the scope of the appended claims.

We claim:

1. In a process for treating fresh raw uncured red meat to preserve the red color of said meat during a storage period of 24 hours or more, the step of introducing into said meat from 0.01 to 0.50 percent by weight of a gamma-pyrone selected from the class consisting of 3-hydroxy-2-methyl-gamma-pyrone, 3-hydroxy-2-ethyl-gamma-pyrone, 5-hydroxy-2-methyl-gamma-pyrone and mixtures thereof, whereby said gamma-pyrone acts to substantially preserve said red color during said period.

2. In a process for treating fresh raw uncured red meat to preserve the red color thereof, the steps of introducing into said meat from 0.01 to 0.50 percent by weight of a gamma-pyrone compound selected from a class consisting of 3-hydroxy-2-methyl-gamma-pyrone, 3-hydroxy-2-ethyl-gamma pyrone, 5-hydroxy-2-methyl-gamma-pyrone and mixtures thereof, and storing said meat into which said gamma-pyrone has been introduced at a temperature of from 30° to 60°F. for a period of at least 24 hours, whereby said gamma-pyrone acts to substantially preserve said red color during said period.

3. A process as set forth in claim 2 wherein said gamma-pyrone is 3-hydroxy-2-methyl-gamma-pyrone.

4. A process as set forth in claim 2 wherein said compound is 3-hydroxy-2-ethyl-gamma-pyrone.

5. A process as set forth in claim 2 wherein said compound is 5-hydroxy-2-methyl-gamma-pyrone.

6. A process as set forth in claim 2 in which said temperature is 30° to 45°F.

7. A process as set forth in claim 2 in which said meat is comminuted.

8. A process as set forth in claim 2 wherein said compound is applied in aqueous solution to the surface of said meat.

* * * * *